Oct. 13, 1931.  J. C. POTTER  1,827,485
MULTIPLE SPINDLE METAL TURNING MACHINE
Filed March 28, 1925    7 Sheets-Sheet 1
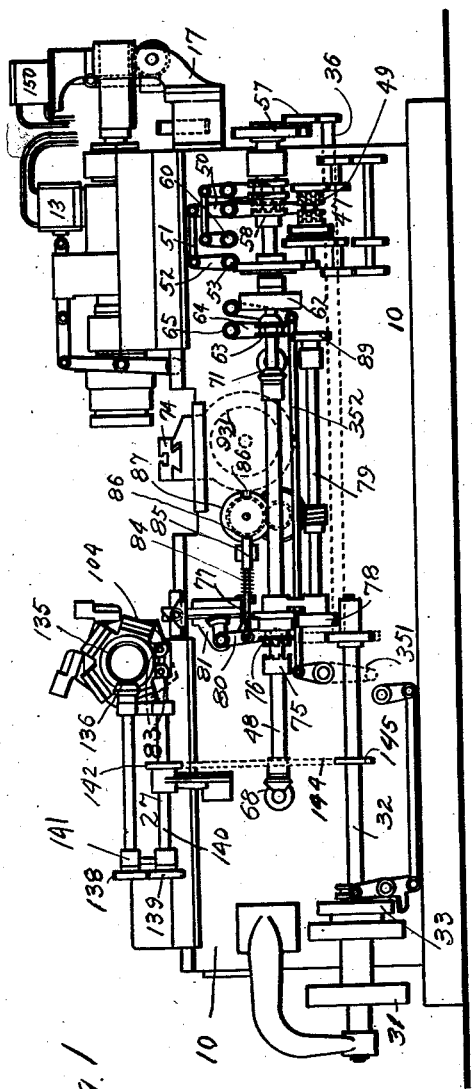

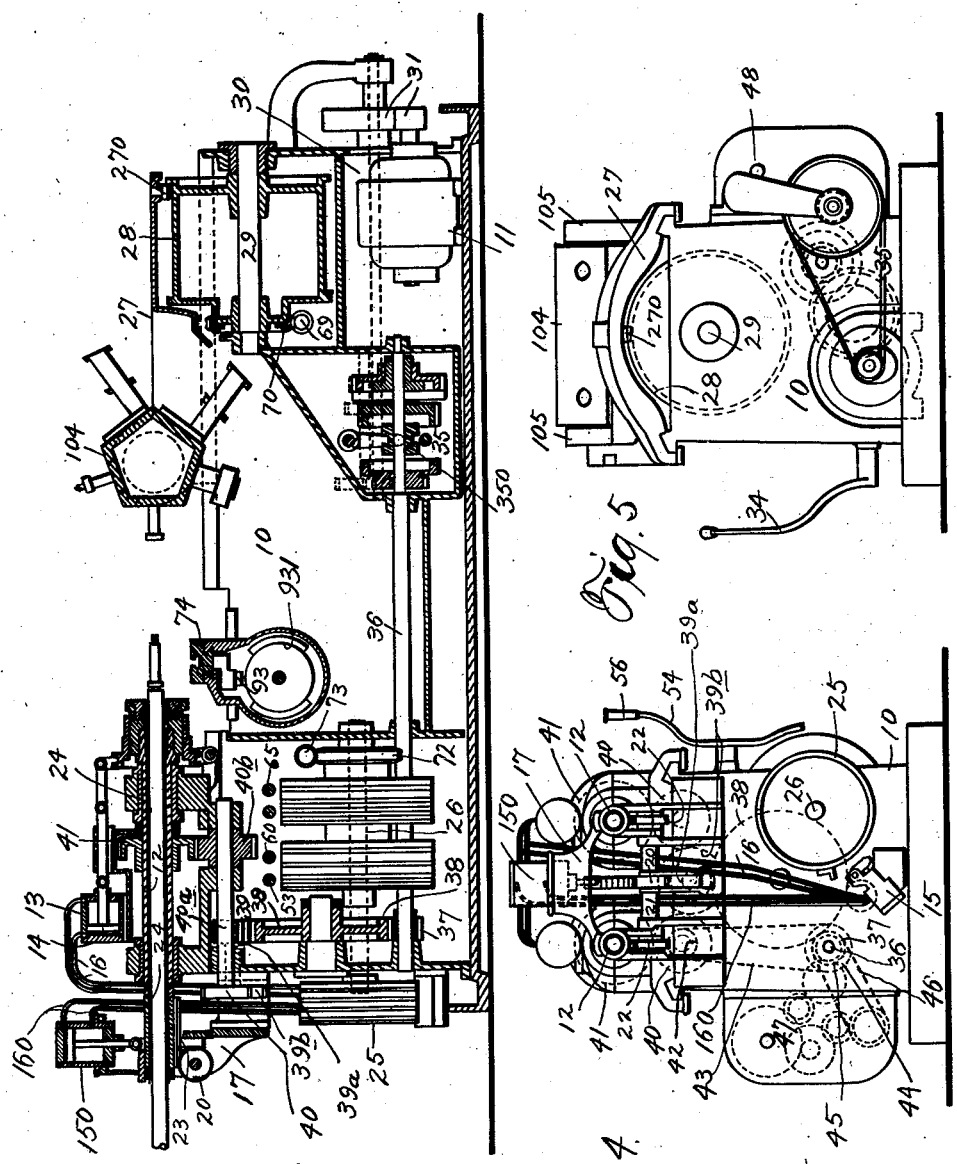

Oct. 13, 1931.   J. C. POTTER   1,827,485
MULTIPLE SPINDLE METAL TURNING MACHINE
Filed March 28, 1925   7 Sheets-Sheet 3
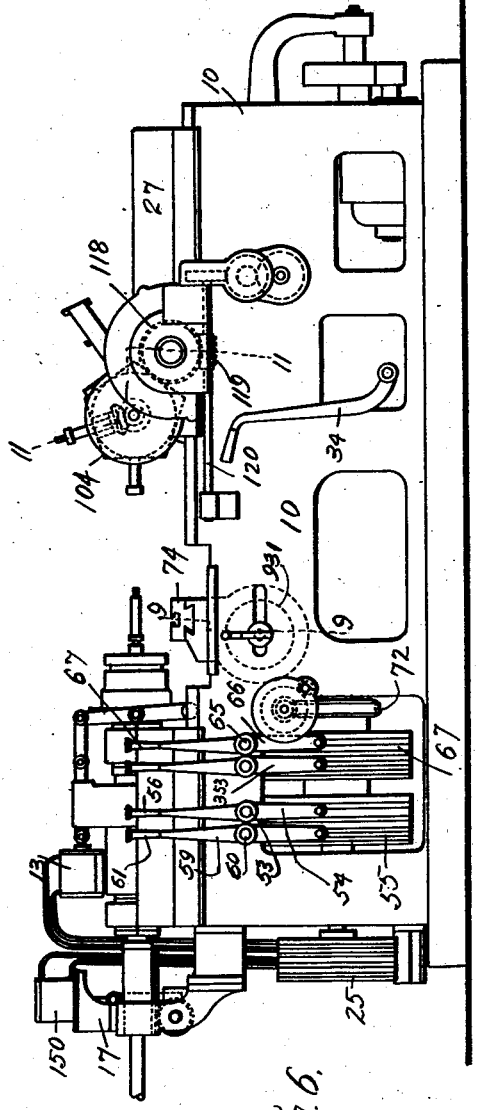
INVENTOR
James C. Potter,
BY
Chas. J. Williamson
ATTORNEY

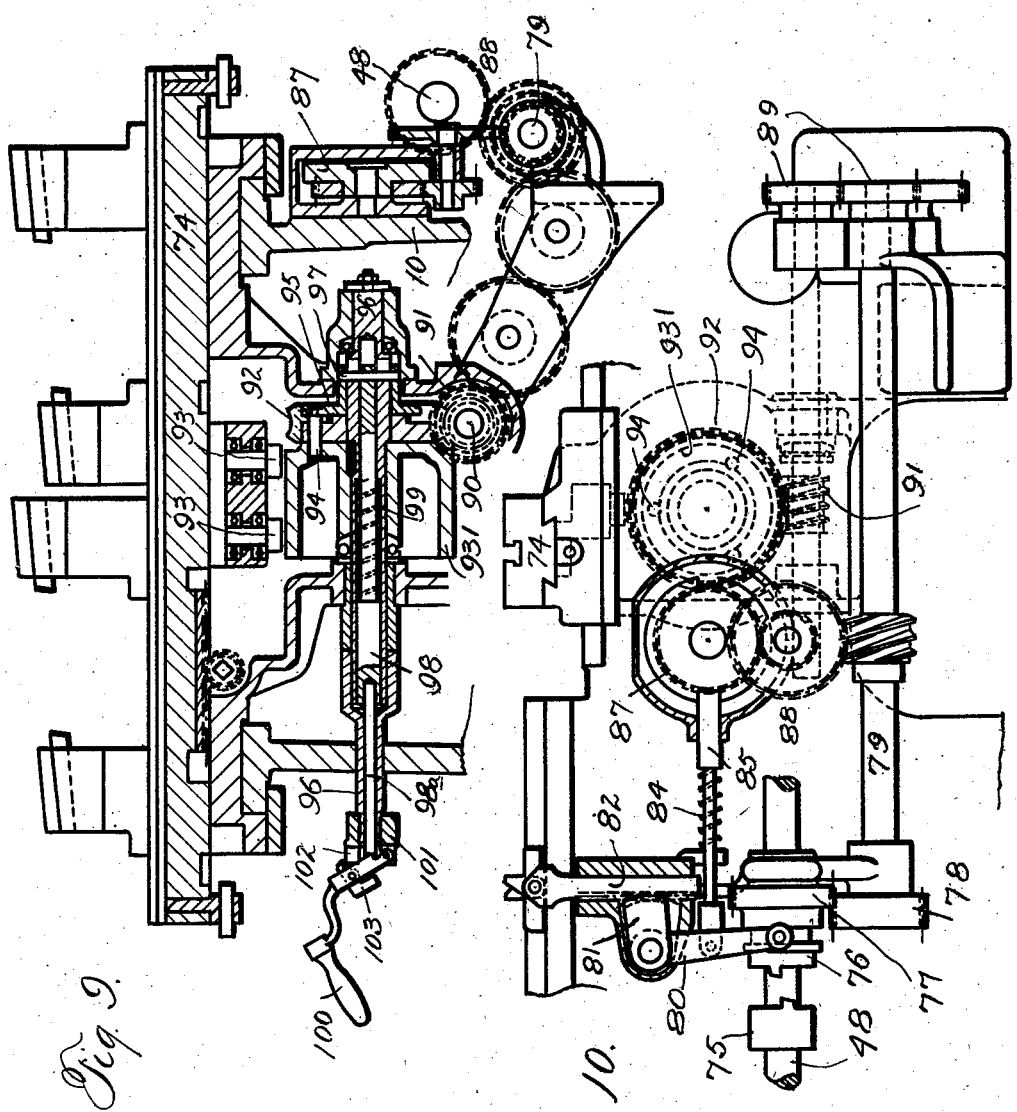

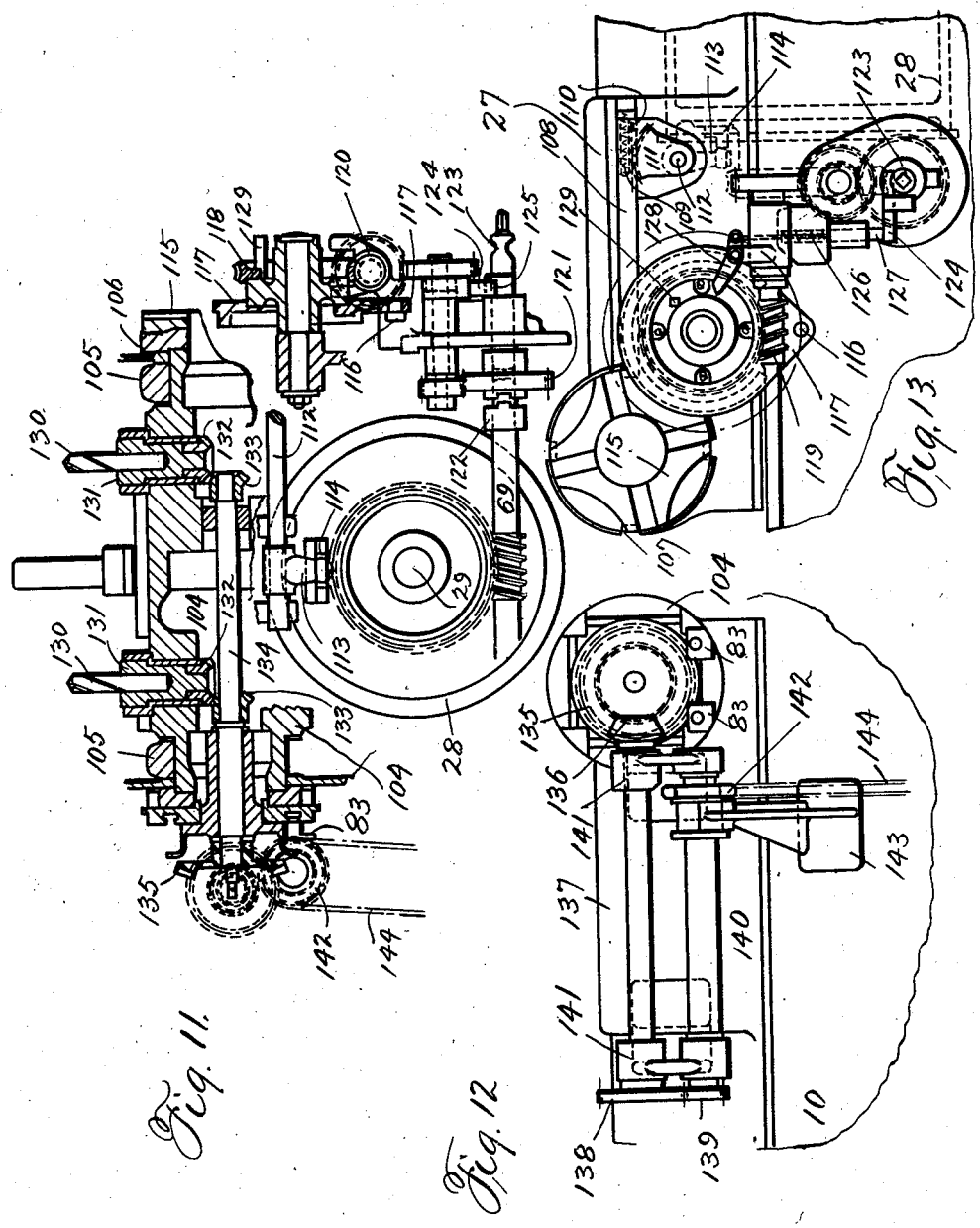

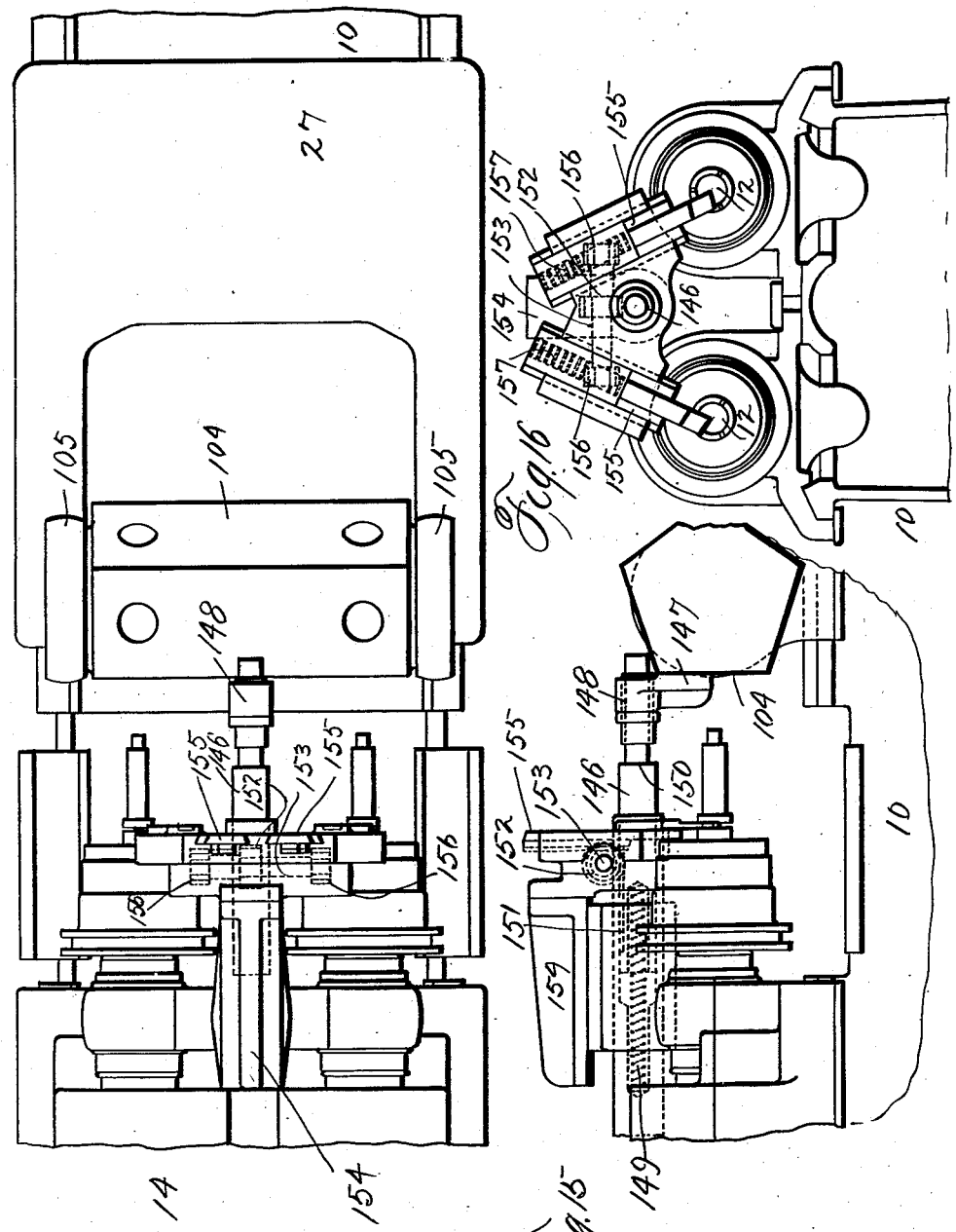

Oct. 13, 1931.   J. C. POTTER   1,827,485
MULTIPLE SPINDLE METAL TURNING MACHINE
Filed March 28, 1925   7 Sheets-Sheet 7
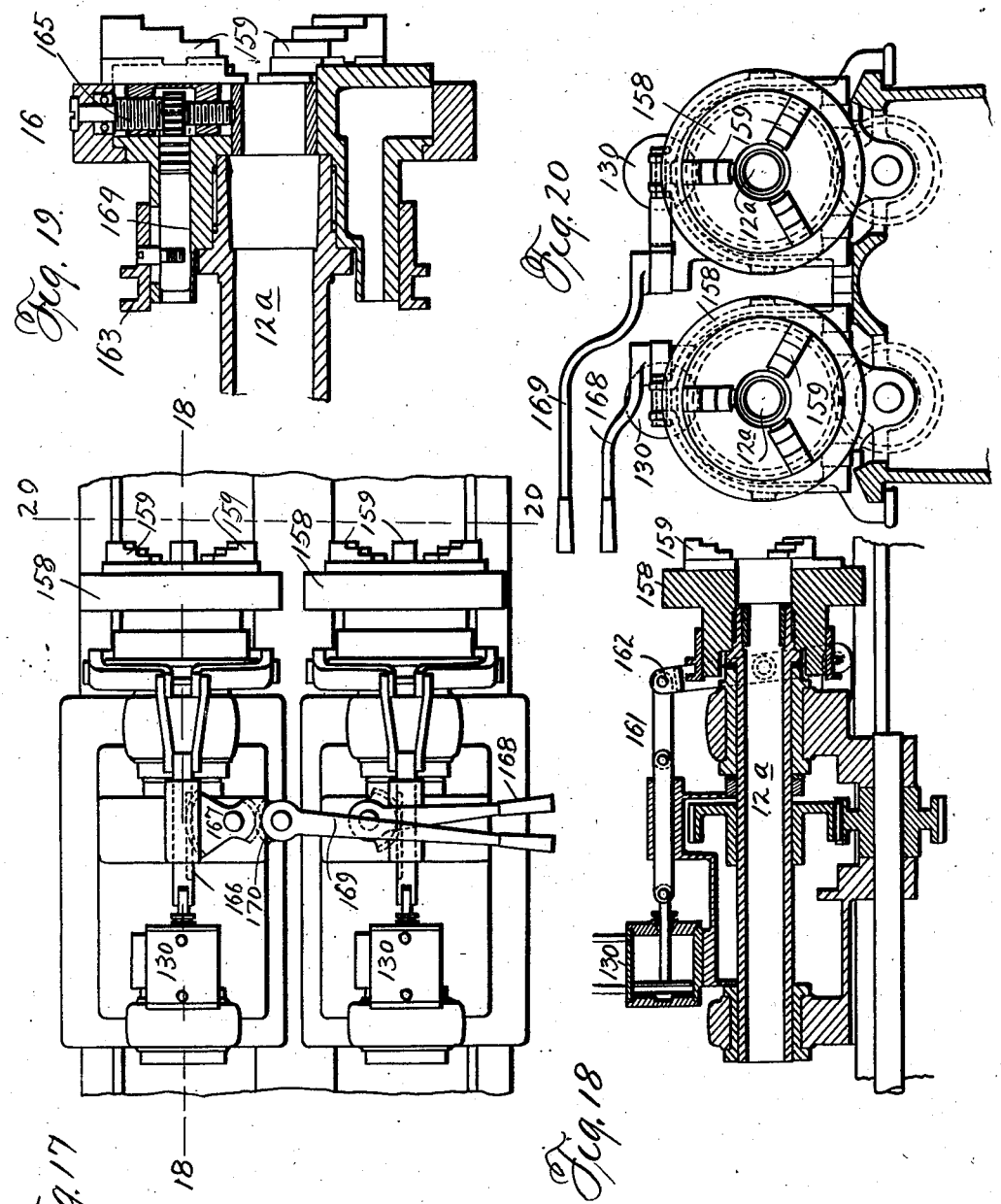

Patented Oct. 13, 1931

1,827,485

UNITED STATES PATENT OFFICE

JAMES C. POTTER, OF PAWTUCKET, RHODE ISLAND

MULTIPLE SPINDLE METAL TURNING MACHINE

Application filed March 28, 1925. Serial No. 19,056.

My invention relates to metal turning machines of the type in which a plurality of similar operations are carried on simultaneously and there are a plurality of sets of tools that are brought successively into work, the tools of the different sets being dissimilar so that one after another a succession of different operations are performed on several pieces of work with the result that simultaneously a number of pieces of work are finished and thus the machine has an output greater than a machine which performs successive operations on but one piece of work at a time. A machine of this type forms the subject of my United States Patent No. 1,363,751 issued December 28, 1920. The object of my invention generally stated is to provide a machine of this type of high efficiency that will be very powerful and not wasteful of power, will be compact so as to call for the minimum of floor space and saving of time and labor of the workmen in attending to it and which may be sold at a reasonable cost.

Referring in a general way to the parts of the machine which my invention affects they are the tool turret and its operating mechanism with a view to the application of the feed so that the power is utilized to the maximum in the cutting operations and accurate work performed; the cross slide operating mechanism to the end that in the limited space available for such mechanism the cross slide tools may work to the highest efficiency and in the precise time relation desired; to the automatic control of spindle speed and tool feed to assure the preservation of a predetermined ratio of speed and feed under variations of spindle speed; to the control of the operation of the spindle chucks by pneumatic or fluid pressure operated means; and to the housing structure to the end that without any objectionable alteration of the machine the motor may be mounted within the housing thus economizing in floor space and making the machine and its power plant a unitary organization. While my invention in what I now consider its most satisfactory embodiment contemplates in one machine all of the characteristics I have just set forth, it is to be understood that I do not restrict myself to such an embodiment. It is also to be understood that my invention extends to machines of the type known as screw machines as well as to what are known as chucking machines. My invention consists in whatever is described by or is included within the terms or scope of the appended claims.

In the accompanying drawings:

Fig. 1 is a rear elevation of a machine embodying my invention;

Fig. 2 is a top plan view thereof;

Fig. 3 is a longitudinal section of the machine;

Figs. 4 and 5 are respectively end elevations;

Fig. 6 is a front side elevation;

Fig. 7 is a detail view of the pneumatic feed mechanism;

Fig. 8 is a section on the line 8—8 of Fig. 7;

Fig. 9 is a cross section of the cross slide operating mechanism;

Fig. 10 is a detail view in side elevation thereof;

Fig. 11 is a detail view in section of the line 11—11 of the Fig. 6;

Fig. 12 is a detail view in elevation of the turret drill operating mechanism;

Fig. 13 is a detail view in elevation of the turret indexing mechanism;

Fig. 14 is a detail view in top plan view of the pilot and cutting-off tool mechanism;

Fig. 15 is a side elevation thereof;

Fig. 16 is a cross section with the pilot and cutting-off tool mechanism shown in elevation;

Fig. 17 is a detail top plan view of the chuck operating mechanism;

Fig. 18 is a section on the line 18—18 of Fig. 17;

Fig. 19 is a detail view in longitudinal section of the chuck;

Fig. 20 is a section on the line 20—20 of Fig. 17.

Referring first to what is shown in Figs. 1 to 16 the base or housing, 10, of the machine shown in the drawings is chambered or hollow so that it encloses as well as supports many of the moving members of the machine including an electric motor, 11, for supplying the power to drive the machine. A problem presented in locating the motor within the housing due to the size of the motor is the preservation of the height of the machine at the point where manipulations by the workman are necessary, it being objectionable to raise the height for obvious reasons, and at the same time increasing the floor space required by the machine. I have solved such problem by the arrangement shown. There are two work spindles, 12, in the machine shown in the drawings which are horizontal and arranged one in rear of the other. The spindles are stationarily mounted, that is to say they are non-indexing and as shown they are of the well known tubular or hollow construction for the passage therethrough of bar stock and each having at one end a collet for clamping the work so that it revolves with the spindle. The collet is closed and opened automatically to clamp and release the work by devices that include an air cylinder, 13, for each spindle having a piston, 14, which is moved in one direction or the other by compressed air or other fluid supplied by two pipes, 16, which is under the control of valve mechanism, 15. For feeding the bar compressed air is also used, being supplied to a cylinder, 150.

From the valve mechanism two pipes, 160, pass to opposite ends of the cylinder which is conveniently supported on a bracket, 17, on the end of the housing, 10, in a vertical position. The piston rod, 18, extends downward and is connected at its lower end to a rack 19, which meshes with a gear, 20, at midlength of a horizontal shaft, 21, which near each end has a gear, 22, which meshes with a rack, 23, on the underside of the usual sleeve, 24, that grips the bar at its forward end, and which is mounted in the hollow spindle or arbor, 12, above the gear, 22, and thus the bar is moved longitudinally. The valve mechanism, 15, is automatically operated at the appointed time by a dog-wheel or drum, 25, outside the housing, 10, upon a horizontal shaft, 26, which shaft carries dog-wheels or drums as hereinafter explained for automatically and at the proper time operating clutches for controlling the spindle speeds and the feed of the tools.

The reciprocation of the turret slide, 27, as usual, is produced by a cam-drum, 28, mounted on a horizontal shaft, 29, at the end of the housing opposite the headstock and below the cam-drum, I provide a compartment, 30, in the housing to receive and contain the electric motor, 11, the armature shaft of which projects outside the housing end and by gearing, 31, is connected with the main drive shaft, 32, on the outside of the housing at the back thereof which is provided with a friction clutch, 33, under the control of a hand lever, 34, at the front of the machine to enable the workman to start and stop the machine.

The main shaft, 32, is geared by gearing, 35, to a horizontal shaft, 36, that may be driven at any one of the three speeds by such gearing, 35, which has a pinion, 37, that meshes with a gear, 38, and which in turn meshes with a smaller gear, 39, on a shaft, 39a, having outside the housing a gear, 39b, situated between and meshing with two change gears, 40, on shafts, 40a, having gears, 40b, which respectively mesh with gears, 41, on the two spindles, 12, and thus power is delivered to the spindles to revolve them. The speed selected is determined by a shiftable clutch collar, 350, engaged by a lever, 351, that by a link, 352, is connected to a dog actuated lever, 353, and the parts mentioned are clearly shown in Figs. 3, 4 and 6.

Upon the same shaft with the gear wheel, 40, which drives one of the spindles is a sprocket wheel, 42, which by a sprocket chain, 43, is connected with a sprocket wheel, 44, loose on the shaft, 36, so that it may revolve independently of the shaft, 36, and connected with the sprocket wheel, 44, at the side thereof is a sprocket wheel, 45, which by a sprocket chain, 46, transmits through any one of several trains of gearing, 47, motion to the feed shaft, 48, situated at the rear of the machine housing, the feed shaft being run at the selected speed at the appointed time by the automatic control of the several trains of gearing, 47, from the appropriate dog-wheel or drum on the dog-wheel shaft, 26.

The trains of gearing, 47, give three changes of feed, the changes from one rate of feed to another being effected by a clutch, 49, which is shiftable by a clutch lever, 50, which is connected by a link, 51, to a lever, 52, on a rock shaft, 53, upon which at the front of the machine is a lever, 54, that is actuated at the proper time by the dog-wheel or drum, 55. The lever, 54, has a handle, 56, for the hand control of the feed. For revolving the speed shaft 48, at a high speed for the quick return and idle movements of the turret slide, 27, there is a train of gears, 57, that takes power from the constant speed shaft, 36, which by a clutch, 58, is drivingly connected or disconnected with the feed shaft said clutch being operated at the appointed times from the dog-wheel, 55, acting upon a lever, 59, at the front of the machine upon a rock shaft, 60, which by a lever and link arrangement is connected with the clutch, the feed shaft then running away from the gearing, 47, see Fig. 1, the clutch mechanism referred to being of well known construction in machine of this description. The lever, 59, like the lever, 54, has a handle, 61, for the hand control of the high speed clutch. By the gearing for changing the rate of feed by varying the rate of revolution of the cam-drum, I do not have to change the cam plates to get different feeds as is ordinarily necessary. All that is necessary is to set the dogs on the feed changing drum to automatically change the feed in proper time to the turret face.

The driving connection between the spindle and the feed shaft is controllable by a friction clutch, 62, having a clutch collar, 63, engaged by a crank, 64, on a rock shaft, 65, that extends to the front of the machine where it has a lever, 66, that is actuated by the dog-wheel or drum, 67, automatically so that on one revolution of the dog-wheel the feed shaft will be disconnected and its revolution stopped, this being a cycle of the machine. A friction clutch is preferably employed to connect the feed shaft and the spindle because it will act as a safety device should there be any obstruction to the feed movement of the tools, for the feed would stop by the slippage of the clutch. The lever, 66, has a handle, 67, for the hand control of the friction clutch, 62.

For driving the turret slide drum, 28, from the feed shaft, 48, there is a bevel gear connected, 68, with the worm shaft, 69, of the worm drive, 70; and by bevel gearing, 71, power is taken from the feed shaft, 48, to drive the dog-wheel shaft, 26, there being a worm wheel, 72, on said shaft, 26, engaged by a worm, 73, on a shaft that is driven from the bevel gearing, 71.

Power to reciprocate the cross slide, 74, is also taken from the feed shaft, 48, and it is one of the important features of my invention that the movements of the cross slide are under the control of and determined by the turret which results in important advantages. Thus, the timing of the movements of the cross slide may be in relation to any one of the turret faces, and the movement of the cross slide in both directions can be controlled by the travel of the turret slide, the forward movement of the turret slide causing movement of the cross slide in one direction and the return movement of the turret causing movement of the cross slide in the opposite direction. In the embodiment of my invention illustrated in the drawings there is a clutch which determines the driving connection between the feed shaft, 48, and the cross slide which clutch is under control of the turret which on the selected face or faces is provided with one or more dogs to produce the movement of the clutch at the appropriate times.

Fixed to the feed shaft, 48, is a clutch collar, 75, and loose on the feed shaft, 48, is a slidable clutch collar, 76, formed on or connected with a gear, 77, which meshes with a gear, 78, fixed to a shaft, 79, parallel with the feed shaft, 48. The slidable clutch collar, 76, is engaged by one arm of a bell-crank lever, 80, the other arm of which has a gear segment, 81, which meshes with a vertical rack bar, 82, mounted in guides on the housing 10, which at the upper end is adapted to be engaged and depressed by a dog or dogs, 83, mounted on the turret, when by the revolution of the turret such dog or dogs are brought to a position that upon the movement of the turret slide, 27, will bring the same into engagement with the upper end of the rack bar, 82, and depress the rack bar on the advance and the return movements, respectively, of the turret slide and thus clutching the cross slide driving mechanism to the feed shaft to cause movement to the cross slide both when the turret is advancing and when same is withdrawing. The rack bar, 82, is lifted to and yieldingly held in its raised position by a coil spring, 84, on a locking bolt, 85, which at one end is connected with the bell-crank, 80, and at the other end is adapted to enter and to be withdrawn from either one of two notches, 86, in a disk, 87, which by a train of gearing, 88, is geared to the shaft, 79. So long as the end of the locking bolt engages the disc periphery the clutch, 76, is held in mesh. The shaft, 79, by a train of gears, 89, is geared to a worm wheel, 92, at one end of a cam-drum, 93, which reciprocates the cross slide, 74. When the bolt engages a notch it stops possible overthrow movement of the cross slide cam-drum. On the underside of the cross slide, 74, there are two rollers or studs, 93, for engagement by the cam plates on the cam-drum, 931, these rollers or studs, 93, being spaced apart longitudinally of the cam-drum. By using the two studs, 93, for successive engagement by the cam plates on the drum, 93, I am able to materially shorten the length of the cam-drum,—the reduction of length being practically one-half compared with the length required to secure a given travel of the cross slide when but one stud or roller is used. When two are used to act successively the slide is moved by the action of one to a point which brings the second stud or roller into position for engagement by the next following cam plate, to reverse the travel of the cross slide. The connection between the cross slide cam-drum, 93, and its worm wheel, 92, is a detachable one to enable the disconnection of the cam-drum from the power driving mechanism, to enable the cam-drum to be rotated by hand in setting up the machine. Such detachable arrangement includes several pins, 94, which pass through alining holes in the head of the drum and the worm wheel and attached to a collar, 95, slidable on the drum shaft, 96, to disengage the pins, 94, from and to re-engage them with the cam-drum holes. The collar, 95, is connected by a diametrically extending pin, 97, with a rod, 98, slidable longitudinally in a axial hole in the drum shaft and which is yieldably pushed by a spring, 99, to enter and to hold the pins, 94, in the cam-drum holes. The rod, 98, is extended by a stem, 98a to the outer end of the drum shaft, 96, and its outer end is engaged by a hand lever, 100, pivoted to a collar, 101, fixed to said shaft, 96, so that by swinging the hand lever, 100, to move the rod, 98, against the spring, 99, the pins, 94, may be disengaged from the cam-drum and at the same time the hand lever or crank, 100, will engage with a diametrical slot, 102, in the collar, 101, so that by means of the crank the shaft, 96, may be rotated to revolve the cross slide cam-drum, the crank being held by a latch, in position for turning the shaft.

The turret, 104, is mounted on the slide, 27, to revolve about a horizontal axis that extends crosswise of the machine and it is journalled at both ends in bearings, 105, that project above the slide. Thus the turret is solidly supported at both ends and hence is stiffly or rigidly held against the pressure or strains to which it is subjected when its tools are at work. Another feature of my invention is the location of the cam-drum engaging roller or stud, 270, so that it is in a line or substantially a line passing horizontally through the turret axis and the spindle axis, the result being that the thrust from the cam-drum upon the turret is substantially directly in line with the turret axis and the spindle axis and hence there is no tendency for the turret under the strain of work to be forced laterally. An incidental result from giving the stud or roller, 270, the position just described is that the turret cam-drum being raised or elevated provides room below it in the housing for the electric motor.

The turret indexing and locking mechanism is best shown in Figs. 11 and 13. Fixed to the turret at one end concentric to the axis thereof is a disc, 106, having in its rim radial notches 107, adapted one at a time to be engaged by a horizontal lock bolt, 108, slidably supported by the turret slide and yieldingly pushed towards the disc by a coil spring, 109. Engaging rack teeth, 110, on the bolt, 108, is a gear segment, 111, on a rock shaft, 112, having a crank or radial finger, 113, in the path of a dog, 114, secured to the thrust cam-drum at the end thereof, and thus at the time for indexing the turret the lock bolt is withdrawn from engagement with one of the notches in the disc, 106. Fixed to the outer side of the disc, 106, is the radially slotted disc, 115, of a Geneva motion, the slots of the disc, 115, being engaged by the tooth or pin, 116, on a disc, 117. The disc, 117, is fixed to a worm wheel, 118, which meshes with a worm, 119, on a shaft, 120, at the front of the machine and which by a train of gears receives motion from the cam-drum worm shaft, 69. Said train of gears includes a gear, 121, having a clutch face which by the sliding of the gear may be clutched to and unclutched from the clutch collar, 122, fixed to the shaft, 69, and when they are unclutched the turret may be indexed by hand. The gear, 121, is carried by an axially movable shaft, 123, having its outer end squared to receive a crank for revolving the shaft by hand for hand indexing of the turret. Normally the shaft, 123, is latched with the gear, 121, clutched to the shaft, 69, by means of a latch, 124, that engages a notch, 125, in the shaft, the latch being yieldingly held in locking engagement with the shaft by coil spring, 126, on a vertically extending stem, 127, on the latch which stem is pivotally connected to a trip lever, 128, which has its free end in the path of a stud or lug, 129, projecting from the side of the worm wheel, 118, which stud engages said trip lever that releases the latch just as the pin, 116, is ready to enter one of the slots of the disc, 115, and the lock bolt is withdrawn. The worm wheel, 118, which carries the releasing stud, 129, is timed to make one revolution to one revolution of the turret cam-drum. And the arrangement described makes it impossible for the workman in hand indexing to derange the proper timing of the parts. When the latch, 124, is thus disengaged from the shaft, 123, the shaft, 123, may be moved to unclutch the gear, 121, from the shaft, 69, and this places the notch, 125, out of alignment with the latch, 124. The Geneva motion for indexing the turret has the important advantage of exerting great leverage at the beginning of the indexing motion and thus makes the starting of the turning of the turret easy.

I mount upon the turret at one of its faces a drill, 130, for each spindle, the drill socket or chuck, 131, being journalled in a radial opening in the turret wall and within an axial chamber in the turret said socket has a bevel pinion, 132, which meshes with a bevel pinion, 133, on a shaft, 134, that extends axially through the turret chamber and at the back of the machine has a bevelled gear, 135. The latter meshes with a bevel pinion, 136, on a horizontally extending shaft, 137, that at its end opposite the pinion has a gear, 138, which meshes with a pinion, 139, on a parallel shaft, 140, the two shafts, 137, and 140, being journalled by brackets, 141, fixed to the turret slide so that the two shafts move with turret slide. On the shaft, 140, is splined a sprocket wheel, 142, which is stationarily supported by a bracket, 143, fixed to the side of the housing, 10, and from the sprocket wheel, 142, a sprocket chain, 144, extends to a sprocket wheel, 145, on the main shaft, and thus power is taken from the latter to revolve the drills.

Referring to Figs. 14 to 16 I illustrate a pilot bar and cutting-off tools arrangement that may be used. The pilot bar, 146, is supported by the headstock midway between the two spindles, 12, and above the latter and secured to a face of the turret is a bracket, 147, with an eye, 148, which aligns with the pilot bar and passes over the projecting end of the same as the turret advances in its work. The pilot bar, 146, is longitudinally slidable, and is pressed yieldingly outward by a coil spring, 149, the bar being moved inward against the pressure of the spring by the engagement of the eye, 148, with a shoulder, 150, on the bar. Rack teeth, 151, are cut in the upper side of the pilot bar which mesh with a pinion, 152, on a transverse shaft, 153, in bearings in a bracket, 154, secured to the headstock which bracket has guideways in which are slidably mounted two cutting-off tools, 155, one for each spindle which extend in downwardly diverging lines towards the spindles. The shaft, 153, has at each end a spiral tooth pinion, 156, which meshes with a rack bar, 157, on the cutting-off tool slide or carrier and thus motion is transmitted to such tools.

Referring to Figs. 17 to 20 I illustrate a chuck, 158, carried by the spindles, 12a, with provision for operating the slidable jaws, 159, of the chuck by compressed air there being for each chuck an air cylinder, 130, the piston of which is connected by linkage, 161, with a lever, 162, that engages a slidable collar, 163, that has connected with it a rack bar, 164, for each jaw to rotate the radial jaw moving screw, 165, all the parts being located externally of the spindle, 12a, so as to leave the axial passage therethrough unobstructed and thus making it easy for using a back-facing bar, for example. For the hand manipulation of each chuck the linkage, 161, includes a rack bar, 166, with which meshes a gear segment, 167, which in the case of one chuck is directly operated by a hand lever, 168, and in the case of the other chuck the hand lever, 169, has a gear segment, 170, which meshes with the teeth of the segment, 167.

What I claim is:

1. The combination of a work spindle, a cross slide, a cam drum for the latter, a turret slide, a turret on the turret slide, a feed shaft for operating both slides, a clutch to control the connection between said cam drum and said feed shaft, and means under the control of the turret for actuating said clutch.

2. The combination of a work spindle, a cross slide, a turret slide, a turret on the turret slide, and means under the control of the turret for controlling the cross slide movements, such means comprising a dog or dogs carried by the turret, a member in the path of the dog or dogs, and a clutch actuated by said member.

3. The combination of a work spindle, a cross slide, a cross slide operating cam-drum, a turret slide, a turret on the turret slide, and means operated by the rotation of the turret for controlling the operation of the cross slide moving drum.

4. The combination of a work-holder, a tool-carrying slide, a cylindrical cam-drum for reciprocating said slide, and a plurality of devices connected with the slide and spaced apart in the direction of the cam drum axis for successive engagement by the cam-drum.

5. The combination of a work-holder, a cross slide, a cylindrical cam-drum for reciprocating said slide, a plurality of cam engaging studs attached to the cross slide spaced apart in the direction of the cam drum axis, a turret slide, a turret mounted to revolve on the turret slide, gearing for rotating said cam-drum and means under control of the turret for timing the movement of the cross slide by the cam-drum.

6. The combination of a plurality of work spindles, automatically controlled gearing for changing the spindle speed, a reciprocating tool slide, a feed shaft, a gear connection between the spindles and the feed shaft which preserves the ratio of the spindle speed and feed, automatically controlled gearing for changing the rate of revolution of the feed shaft whereby the rate of feed may be changed for the performance of work, and a high speed driving means for said feed shaft that drives the feed shaft independently of said gearing.

7. The combination of a housing, a headstock on the housing at one end, a tool slide on the housing at the other end, a slide reciprocating drum within the housing having its slide-engaging member substantially in line with the thrust of the tool on the work, a motor within the housing beneath the drum, and a driving connection between the motor and the head-stock mechanism and the cam-drum.

8. The combination of a housing, a headstock on the housing at one end, a tool slide on the housing at the other end, a slide reciprocating drum within the housing having its slide-engaging member substantially in line with the thrust of the tool on the work, a motor within the housing, and a driving connection between the motor and the headstock mechanism and the cam-drum, said motor being situated beneath the cam-drum.

9. The combination of a housing, a headstock on the housing at one end, a tool slide on the housing at the other end, a slide reciprocating drum within the housing, a motor within the housing, and a driving connection between the motor and the head-stock mechanism and the cam-drum, comprising gearing outside of and adjacent the near end of the housing, the motor being wholly within the housing.

10. The combination of a plurality of work spindles arranged side by side, automatically controlled gearing for changing the speed of the spindles, a single reciprocating tool slide, tool-holders for the respective spindles mounted on the single slide, a single feed shaft operatively connected with said slide, a gear connection between all the spindles and the single feed shaft which preserves the ratio of the spindle speed and tool feed, automatically controlled gearing for changing the rate of revolution of the feed shaft, whereby the rate of feed may be changed for the performance of work, and a high speed driving means for said feed shaft that drives the feed shaft independently of said gearing.

11. The combination of a work-holder, a tool slide, a cylindrical cam drum for reciprocating said slide having separate cam surfaces on its periphery spaced apart axially of the drum and circumferentially and a plurality of devices connected with the slide and spaced apart in the direction of the cam drum axis for successive engagement by said cam drum surfaces.

12. The combination of a plurality of work-spindles each having a chuck and arranged in the same horizontal plane, means for rotating the spindles simultaneously at the same speed, means supporting a plurality of sets of tools in the same horizontal plane, means for slidably supporting said plurality of sets of tools for movement towards and from the spindle chucks, mechanism for producing such sliding movement comprising a cam drum and a feed shaft, means for operating the cam drum at high and constant speed during the non-cutting action of the tools, hand change gears for changing the spindle speeds to suit the work requirements, and means to change the speed of said shaft to vary the rate of tool speed.

13. The combination of a plurality of work-spindles each having a chuck and arranged in the same horizontal plane, a motor-driven shaft, gearing between said shaft and said spindles that rotates the spindles simultaneously and at the same speed, hand change gears for the spindles to change the spindle speeds to suit the work requirements, means for supporting a plurality of sets of tool-holders in the same horizontal plane, means for slidably supporting said plurality of sets of tool-holders for movement towards and from the spindle chucks, mechanism for producing such sliding movement by which the plurality of sets of tool-holders are moved at the same time towards and from the spindle chucks and comprising a cam drum and a feed shaft, means for operating the cam drum at high and constant speed during the non-cutting action of the tools and means to change the speed of said shaft to vary the rate of tool speed.

In testimony whereof I hereunto affix my signature.

JAMES C. POTTER.